(12) United States Patent
Lin et al.

(10) Patent No.: US 10,663,843 B2
(45) Date of Patent: May 26, 2020

(54) PROJECTOR

(71) Applicant: Coretronic Corporation, Hsin-Chu (TW)

(72) Inventors: Shih-Kan Lin, Hsin-Chu (TW); Chia-Tien Chen, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/383,669

(22) Filed: Apr. 15, 2019

(65) Prior Publication Data

US 2019/0384144 A1   Dec. 19, 2019

(30) Foreign Application Priority Data

Jun. 15, 2018   (CN) .................... 2018 2 0927693 U (51) Int. Cl.
*G03B 21/14*   (2006.01)
*G03B 21/16*   (2006.01)

(52) U.S. Cl.
CPC .......... *G03B 21/145* (2013.01); *G03B 21/16* (2013.01)

(58) Field of Classification Search
CPC ............................ G03B 21/145; G03B 21/16
USPC ....................................................... 353/119
See application file for complete search history.

(56) References Cited

U.S. PATENT DOCUMENTS

2008/0002156 A1* 1/2008 Hsu ..................... G03B 21/16
                                                               353/57
2010/0208216 A1   8/2010 Hirabayashi

FOREIGN PATENT DOCUMENTS

CN   107485303        12/2017
JP   2008286958 A  * 11/2008 ............. G03B 21/00
TW   201327098         7/2013

OTHER PUBLICATIONS

Machine Translation of JP2008286958A (Year: 2019).*

* cited by examiner

*Primary Examiner* — Jerry L Brooks
(74) *Attorney, Agent, or Firm* — JCIPRNET (57) ABSTRACT

The invention provides a projector which is characterized by including a housing, a control module and a sensor. The housing is provided with a mounting structure and at least one air flowing hole. The mounting structure is located inside the housing, and the air flowing hole communicates with external environment and an interior of the housing. The control module is disposed inside the housing. The sensor is arranged on the mounting structure and aligns to the air flowing hole. The sensor is electrically connected with the control module, and the sensor receives a remote control optical signal from the external environment to generate an electrical signal and the sensor transmits the electrical signal to the control module. In this way, the manufacturing process of the projector is simplified and the manufacturing cost is reduced.

12 Claims, 9 Drawing Sheets

PROJECTOR

CROSS-REFERENCE TO RELATED APPLICATION

This application claims the priority benefit of China application serial no. 201820927693.2, filed on Jun. 15, 2018. The entirety of the above-mentioned patent application is hereby incorporated by reference herein and made a part of this specification.

BACKGROUND OF THE INVENTION

1. Field of the Invention

The present invention relates to a projector.

2. Description of Related Art

A projector is a display device for outputting large-size images. An imaging principle of projectors is that a projection module projects an image beam through a projection lens to form an image on a screen. Projectors play a very important role in the transmission of information, and are therefore widely used in many fields. For example, a projector is used with a projection screen to display the content of image information provided by an image source.

Generally speaking, the user can wirelessly connect and control the projector through a handheld control device, such as a remote controller, to improve convenience. As a result, the projector must dispose a corresponding receiving hole in its housing to facilitate the installation of a sensor at the receiving hole. However, this action causes obvious visual defects to the appearance of the housing of the projector. At present, an additional light-transmitting colored plate is often arranged to cover the receiving hole for providing a visual modification effect to the receiving hole, but this is likely to cause an increase in cost and number of components in a manufacturing process.

In addition, since the sensor needs to be packaged on a circuit board first, for the manufacturing process of the housing, a relevant structure for fixing the circuit board needs to be arranged on the housing. Thus, it is not helpful to simplify the manufacturing process of the projector and reduce the manufacturing cost.

The information disclosed in this "background" section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides a projector. The projector has a simple housing structure for mounting a sensor, thus simplifying a manufacturing process of the projector and reducing manufacturing cost of the projector.

Other objectives and advantages of the invention may be further understood from the technical features in the following disclosure.

In order to achieve one, some, or all of the aforementioned objectives or other objectives, the embodiment of the invention comprises a projector, including a housing, a control module and a sensor. The housing is provided with a mounting structure and at least one air flowing hole. The mounting structure is located inside the housing, and the air flowing hole communicates with external environment and an interior of the housing. The control module is disposed inside the housing. The sensor is arranged on the mounting structure and aligns to the air flowing hole. The sensor is electrically connected with the control module, and the sensor receives a remote control optical signal from the external environment to generate an electrical signal, and the sensor transmits the electrical signal to the control module.

Based on the above, the embodiment of the invention has at least one of the following advantages or effects:

Since at least one air flowing hole is disposed on the housing of the projector for communicating the interior of the housing with the external environment, and the sensor is arranged on the mounting structure in the housing and aligns to the air flowing hole, the sensor can receive the remote control optical signal transmitted from the external environment through the air flowing hole, and convert the remote control optical signal into the electrical signal, and the sensor transmits the electrical signal to the control module. Accordingly, the sensor can operate normally by using the air flowing hole disposed in the housing for air circulation without an additional opening (hole) or even adding a plate for the decoration on the housing for the sensor, that is to say, the air flowing hole in the housing can be used for both air circulation and receiving the external remote control optical signal.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
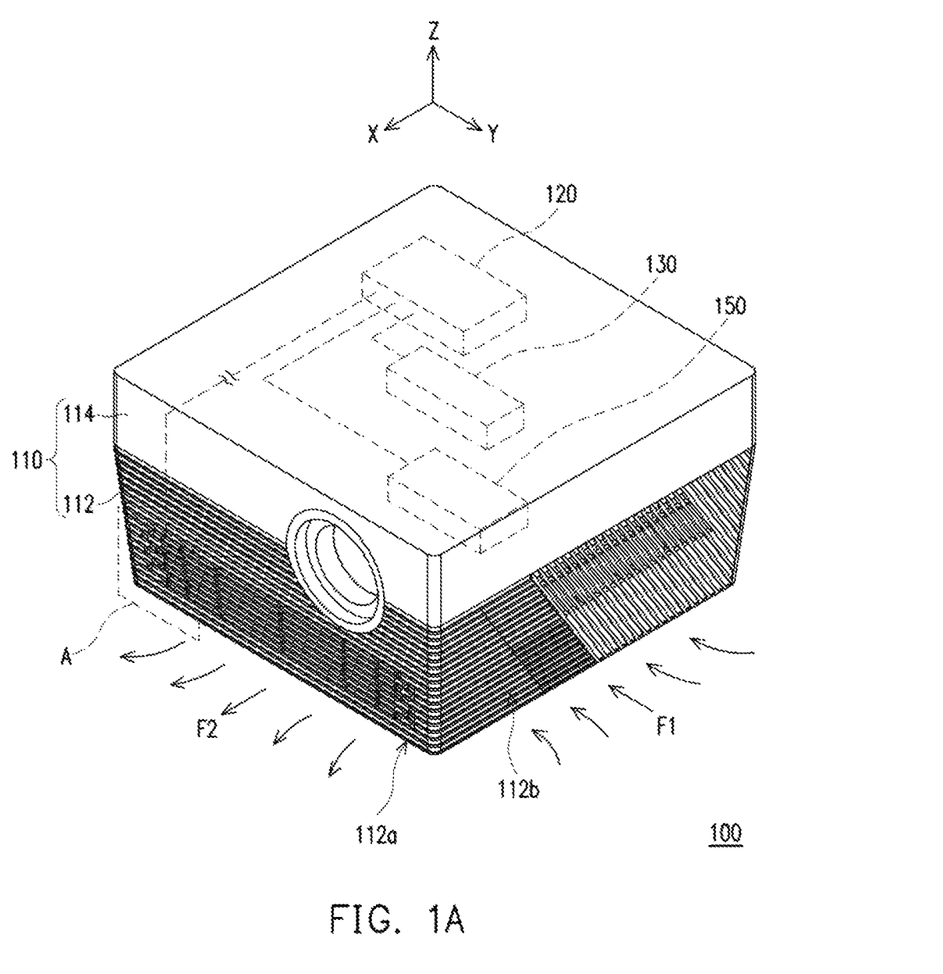
FIG. 1A is a schematic diagram of a projector according to an embodiment of the invention.
Figure 1B:
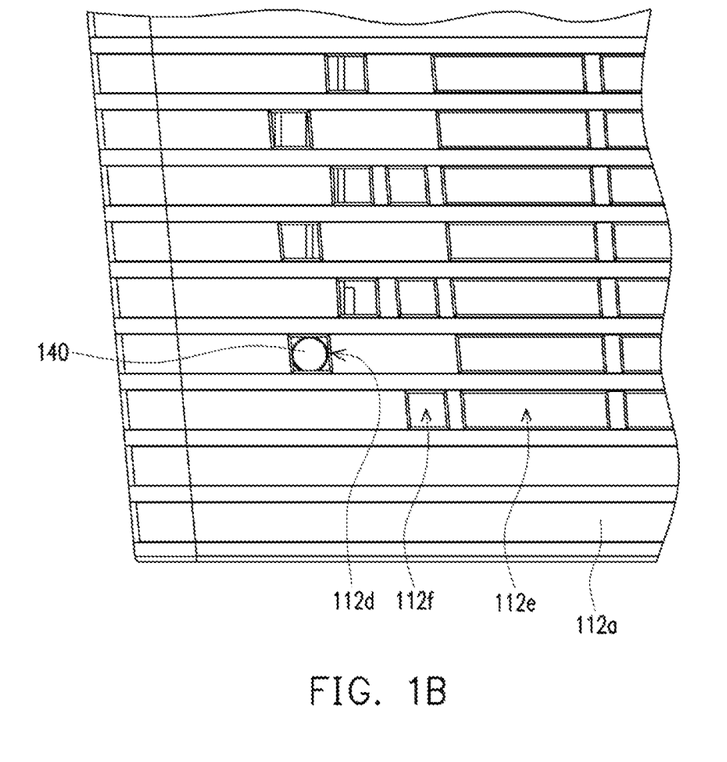
FIG. 1B is a partial front view of the projector of FIG. 1A at part A.
Figure 2A:
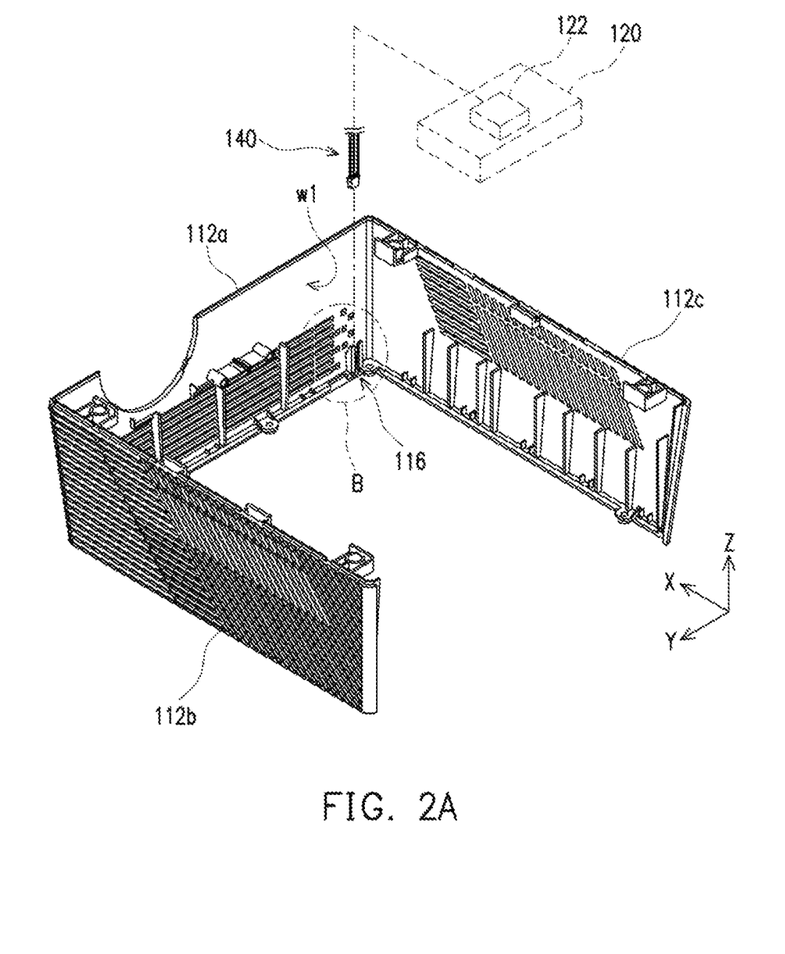
FIG. 2A is a schematic view of part of components of the projector of FIG. 1A.

FIG. 1A is a schematic diagram of a projector according to an embodiment of the invention. FIG. 1B is a partial front view of the projector of FIG. 1A at part A. FIG. 2A is a schematic view of a part of components of the projector of FIG. 1A. At the same time, right-angled coordinates X-Y-Z are provided to facilitate component description. Referring to FIG. 1A, FIG. 1B and FIG. 2A, a projector 100 includes a housing 110, a control module 120, a heat dissipation module 130, a sensor 140 and a projection module 150. It should be noted that in the present embodiment, dashed lines serve as schematic reference of relevant electronic modules and an electrical connection relationship thereof in FIG. 1A and FIG. 2A, and do not therefore limit the structural configuration mode of the present embodiment.

In the embodiment, the housing 110 of the projector 100 includes an upper housing body 114 and a lower housing body 112 which are combined with each other. The sensor 140, the control module 120, the heat dissipation module 130 and the projection module 150 are respectively arranged inside the housing 110. The sensor 140, the heat dissipation module 130 and the projection module 150 are respectively electrically connected with the control module 120, and thereby the control module 120 can drive the sensor 140, the heat dissipation module 130 and the projection module 150 to respectively make relevant actions accordingly, wherein the control module 120 can drive the projection module 150 to generate an image beam so as to projecting the image beam out of the housing 110 through a projection lens (as shown in FIG. 1A, not numbered herein) arranged on the housing 110, and as described above, together with a projection screen, the projector 100 can display the content of image information through a schematic picture.

Since in the projection module 150 of the projector 100, thermal energy may be generated by the projection-related components (not shown) such as a light source and a light valve when the projection-related components operate, it is necessary to install the heat dissipation module 130 within the housing 110 to dissipate heat from these heat generating components to avoid overheating of the projector. The heat dissipation module 130 herein is composed of, for example, at least one heat pipe, at least one heat dissipation fin set, at least one fan and other relevant components through selection or combination, so that the heat generated by the components is transferred to the heat dissipation module 130, and the heat is carried out of the housing 110 by natural airflow or forced airflow provided by the fan of the heat dissipation module 130. As shown in FIG. 1A and FIG. 1B, a plurality of air flowing holes 112d, 112e and 112f are disposed in a front plate 112a of the lower housing body 112. Similarly, a plurality of air flowing holes (as shown in FIG. 1A and FIG. 2A) are disposed in two opposite side plates 112b and 112c of the lower housing body 112. Therefore, in the embodiment, with the operation of the heat dissipation module 130, airflow F1 flows into an interior of the housing 110 through the air flowing holes of the side plate 112b (112c), and flows out of the housing 110 through the air flowing holes (e.g., 112d, 112e and 112f) of the front plate 112a to achieve the heat dissipation effect; or the airflow flows into the interior of the housing 110 through the air flowing holes (e.g., 112d, 112e, and 112f) of the front plate 112a, and flow out of the housing 110 through the air flowing holes of the side plate 112b (112c). The invention does not limit a direction of airflow, as long as the heat dissipation effect can be achieved, any direction falls within the scope of the invention.

It should be noted that the housing 110 is also provided with a mounting structure 116 arranged on the lower housing body 112 and located on an inner surface w1 of the front plate 112a of the housing 110, and the sensor 140 can right face the air flowing hole 112d after disposing on the mounting structure 116. In this way, a user can operate a handheld control device, such as a remote controller, in the external environment, so that a remote control optical signal sent from the control device can be received by the sensor 140 through the air flowing hole 112d, and the remote control optical signal is converted into an electrical signal by the sensor 140, and the electrical signal is transmitted to the control module 120.

Thus, the remote control optical signal from the external environment is received by the sensor 140 through the air flowing hole 112d disposed in the housing 110. In other words, for the housing 110 of the projector 100, there is no need to additionally provide a hole dedicated to the sensor 140 or a light-transmitting colored plate corresponding to the hole, thus providing a concise visual effect on the appearance of the housing 110, and at the same time simplifying a design and a manufacturing process of the housing 110 and reducing manufacturing cost.

It should be mentioned that the housing 110 of the projector 100 is substantially arranged as a multi-opening structure for smoothly dissipating the heat (airflow circulation). For example, the lower housing body 112 of the housing 110 is provided with the plurality of air flowing holes 112d, 112e and 112f located at the front plate 112a of the lower housing body 112, and at the same time, the side plates 112b and 112c of the lower housing body 112 are also provided with the plurality of air flowing holes. Therefore, the position of the sensor 140 within the housing 110 corresponds to any one of the air flowing holes. That is, the embodiment does not limit the positions of the mounting structure 116 and the sensor 140 inside the housing 110. In a design stage of the housing 110, the air flowing holes can be arranged at any position of the housing 110 according to various requirements such as heat dissipation, and the mounting structure 116 can be designed at the required corresponding position so that the sensor 140 can correspond to at least one of the air flowing holes 112d, 112e and 112f (or other air flowing holes).

In addition, for visual aesthetics, for example, there are many different colors or different visual structures on an exterior of the housing 110, for example, lattice or grid structures shown in FIG. 1A and FIG. 2A for the embodiment, so that the holes 112d, 112f, 112e are designed to correspond to the lattice or the grid structures. This design provides a decoration effect to the air flowing holes 112d, 112e and 112f, thus making it difficult for a user to perceive the holes 112d, 112e and 112f, and accordingly, the sensor 140 arranged in the housing 110 is hidden visually, and thus is not easy to be seen by the user.

Figure 2B:
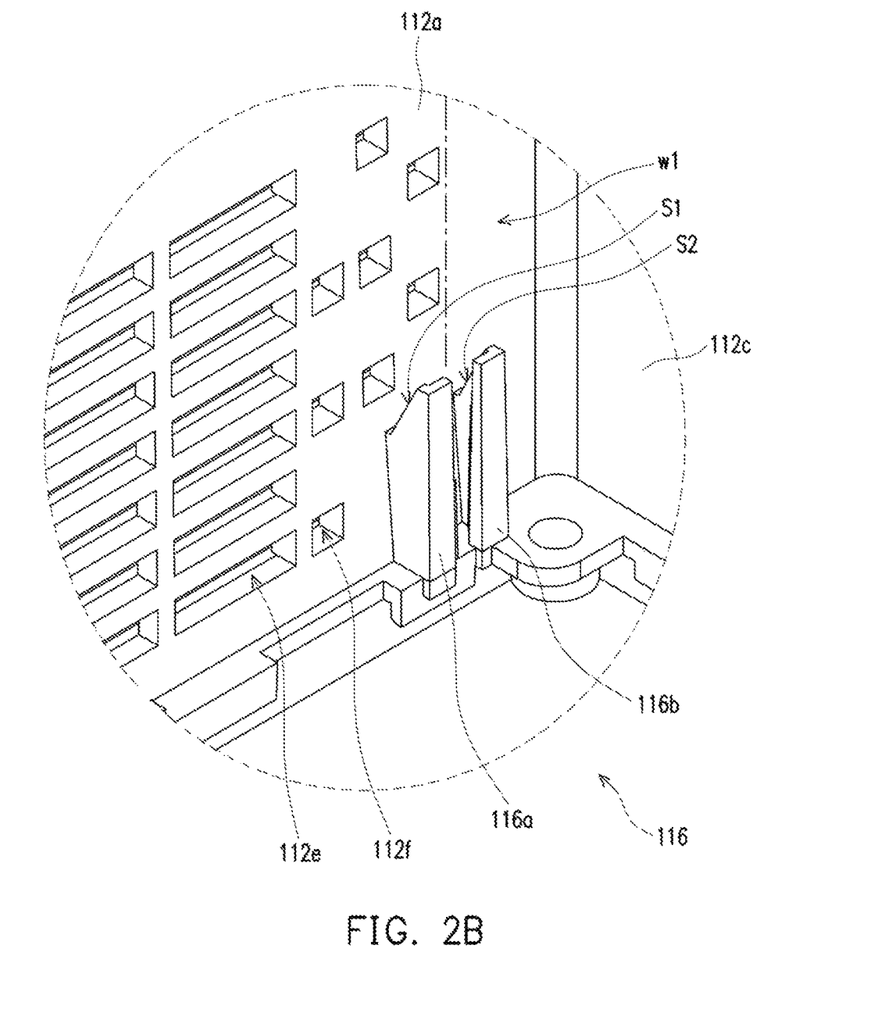
FIG. 2B is a partial enlarged view of FIG. 2A at part B.
Figure 3A:
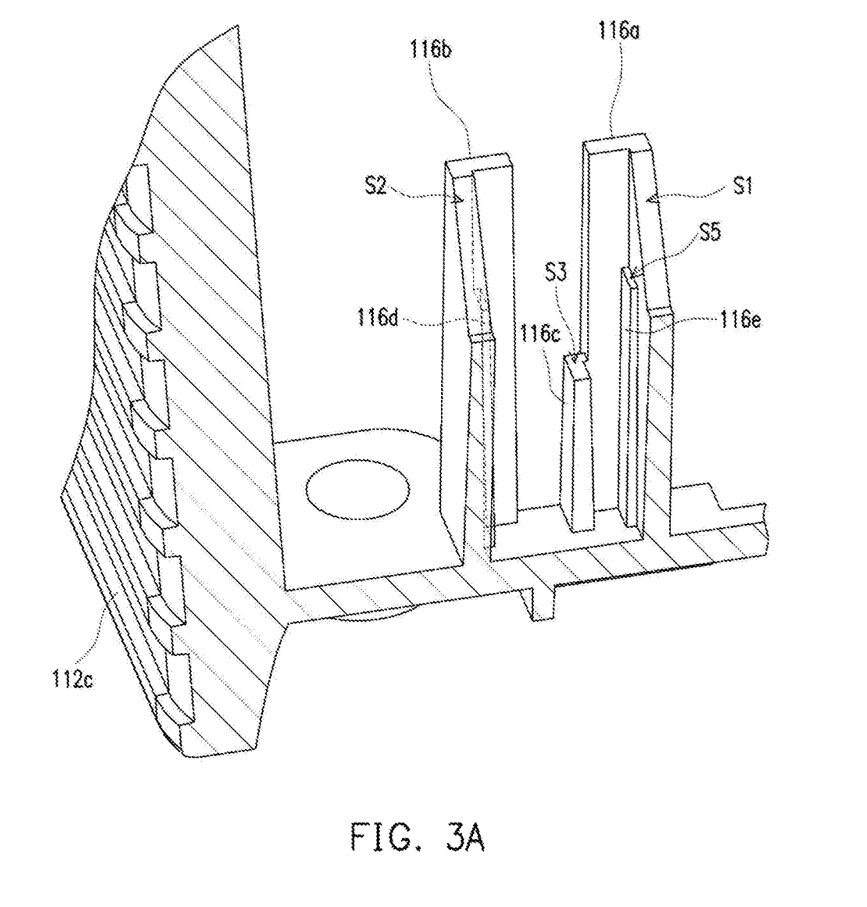
FIG. 3A and FIG. 3B show partial cross-sectional views of a mounting structure from different perspectives respectively.
Figure 3B:
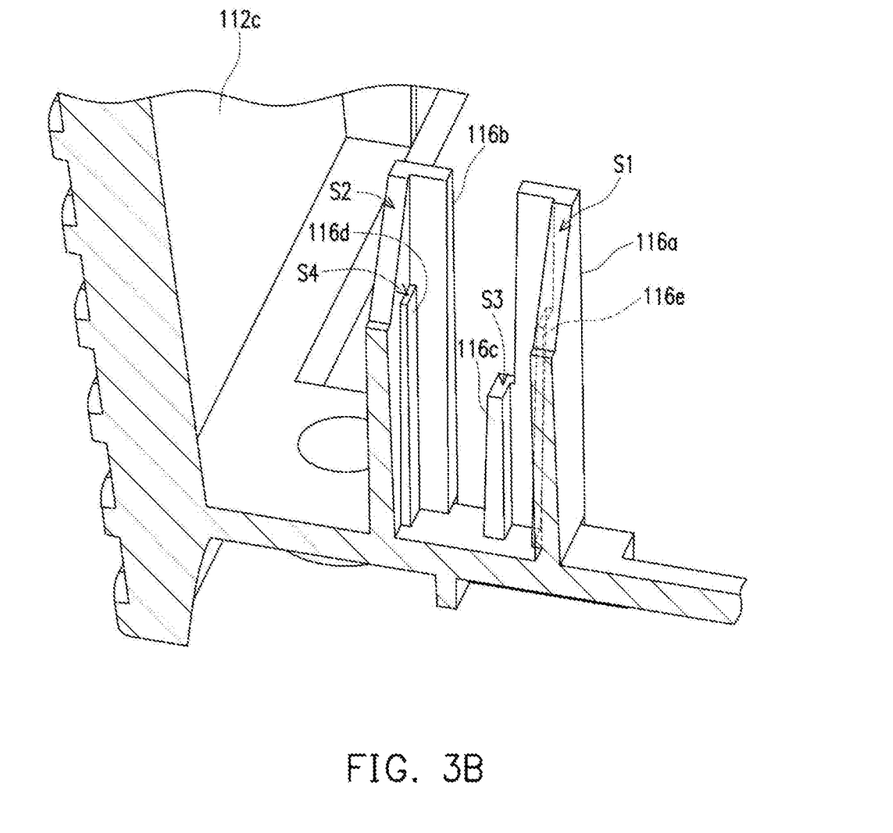
Figure 4A:
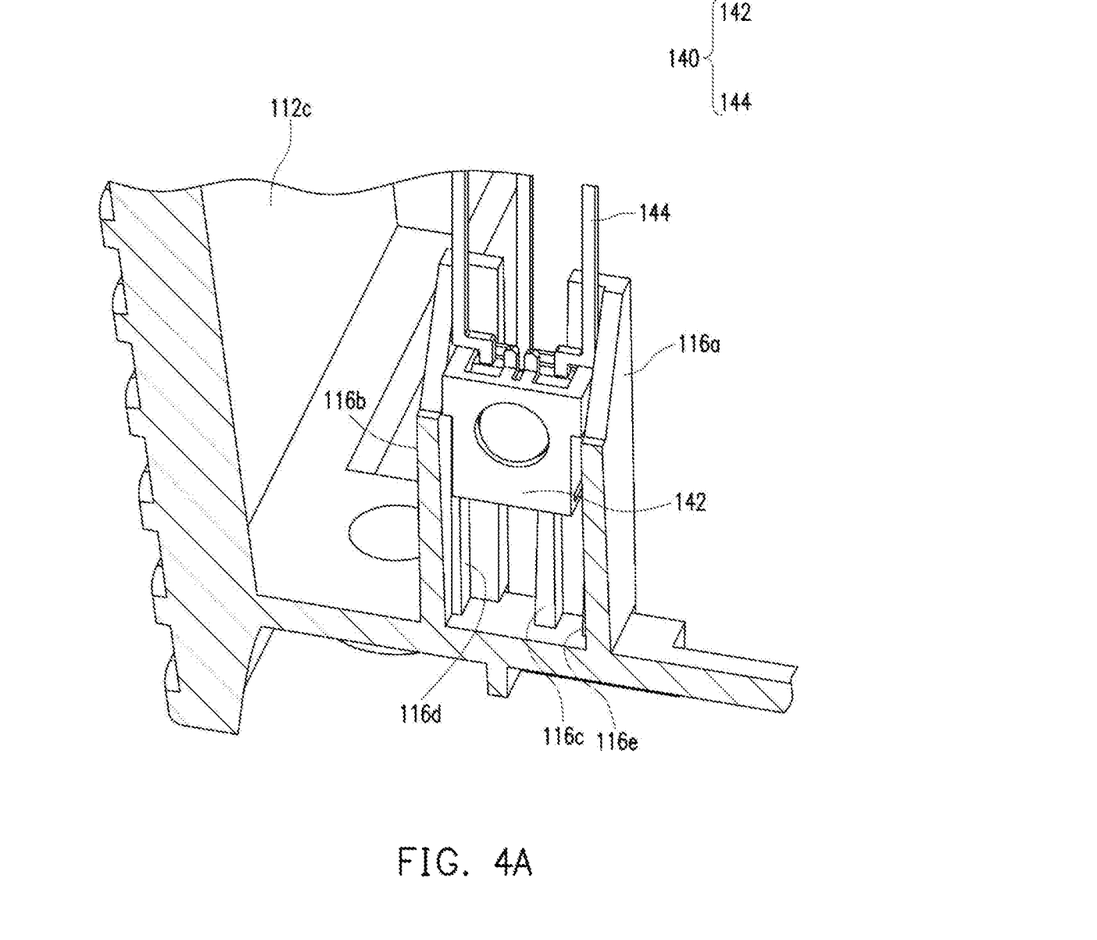
FIG. 4A is a schematic view of the mounting structure of FIG. 3B in combination with a sensor.

FIG. 2B is a partial enlarged view of FIG. 2A at part B. FIG. 3A and FIG. 3B show partial cross-sectional views of the mounting structure from different perspectives respectively, where the front plate 112a is removed to clearly identify relevant features of the mounting structure 116. FIG. 4A is a schematic view of the mounting structure of FIG. 3B in combination with the sensor. Referring to FIG. 2A and FIG. 4A first, in the embodiment, the sensor 140 is in a circuit board-free state, that is, the sensor 140 includes a sensing unit 142 and a wire portion 144, the sensing unit 142 is arranged on the mounting structure 116 and right faces the air flowing hole 112d for receiving the remote control optical signal sent from the control device (not shown). One end of the wire portion 144 is directly electrically connected to an electrical pin of the sensing unit 142 and another end is electrically connected to a circuit board 122 disposed at the control module 120, therefore, the sensing unit 142 receives the remote control optical signal from the external environment and converts the remote control optical signal into the electrical signal, which is then transmitted directly to the circuit board 122 of the control module 120 through the wire portion 144. Since the sensing unit 142 does not need to be directly disposed on the circuit board as in the prior art, the electrical signal is transmitted to the circuit board 122 in an effective and rapid manner and then processed to improve the overall electrical signal processing efficiency. At the same time, for the housing 110, there is no need to arrange another structure for assembling and fixing the circuit board, which can also effectively reduce the complexity inside the housing 110 and the manufacturing cost.

Figure 4B:
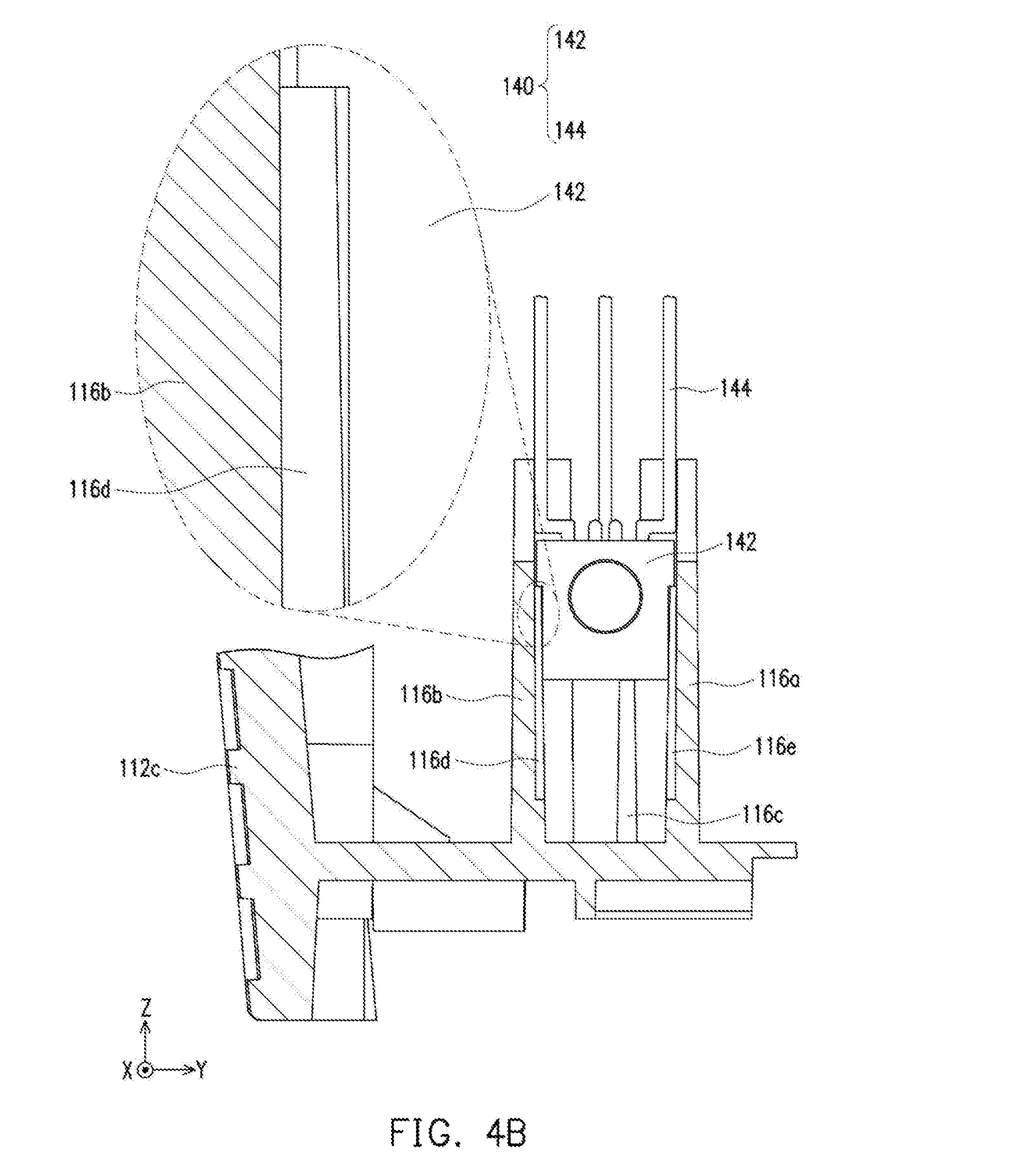
FIG. 4B is a front view of FIG. 4A.
Figure 4C:
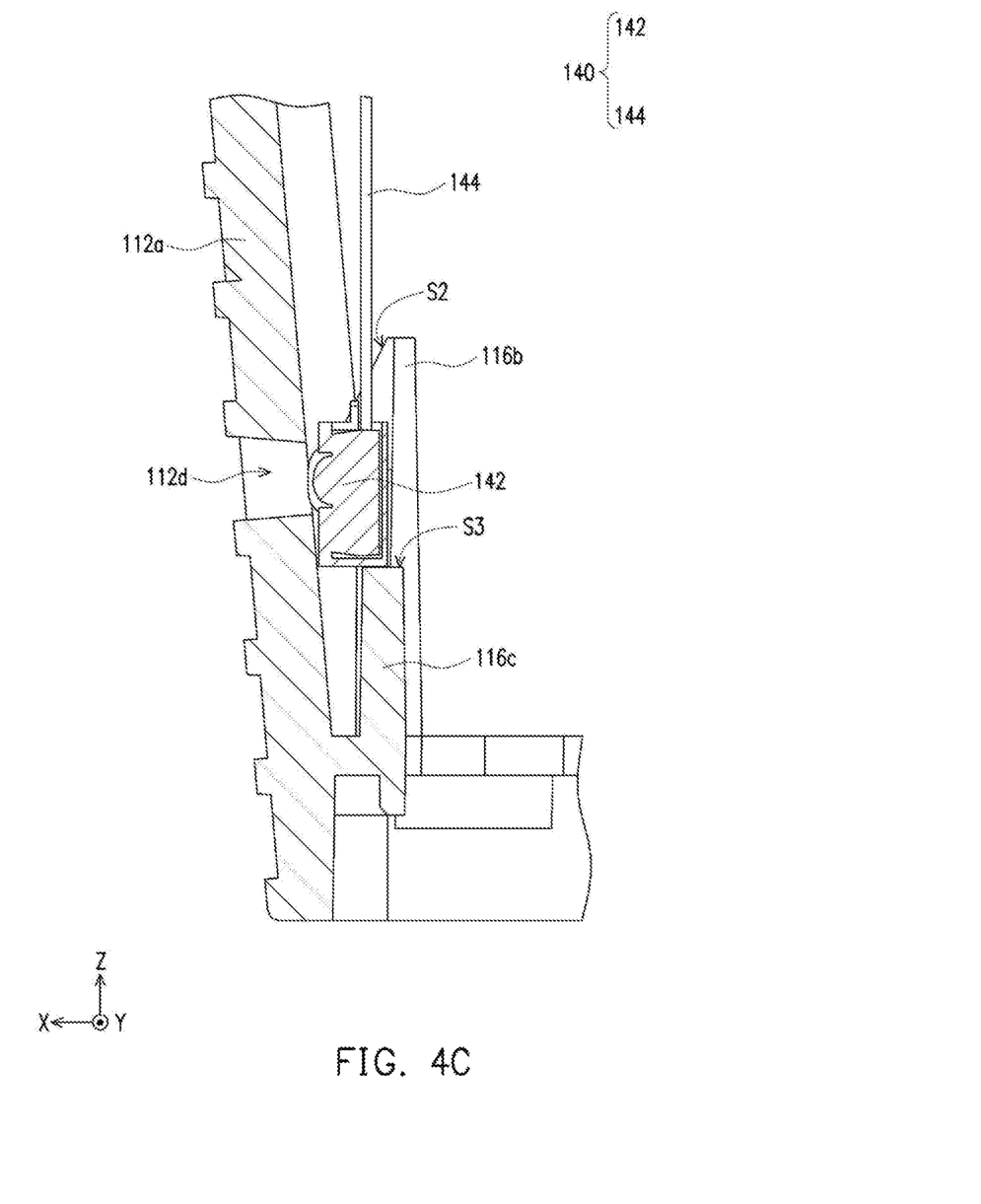
FIG. 4C is a partial cross-sectional view of FIG. 4A from a side view.

FIG. 4B is a front view of FIG. 4A. FIG. 4C is a partial cross-sectional view of FIG. 4A from a side view. Referring to FIG. 3A and FIG. 3B as well as FIG. 4A to FIG. 4C at the same time, a corresponding relationship between the mounting structure 116 and the sensor 140 can be clearly understood.

In the embodiment, the mounting structure 116 is integrally formed on an inner surface w1 of the housing 110 (as shown in FIG. 2B), and a relationship between the mounting structure 116 and the housing 110 can be represented by the same cross section line. The mounting structure 116 includes chutes 116a and 116b, and a stop part 116c, wherein the chutes 116a and 116b extend along the inner surface w1 of the housing 110 (as shown in FIG. 2B), the bottom of each chute is connected to the housing 110, and the top of each chute forms an inlet for the sensor 140 to move in. The stop part 116c is located between the chutes 116a and 116b, and the sensing unit 142 of the sensor 140 moves into the chutes 116a and 116b via inlets of the chutes 116a and 116b and abuts against the stop part 116c, so that the sensing unit 142 of the sensor 140 can be aligned with and right face the air flowing hole 112d under the limiting of the chutes 116a and 116b.

Further, the chutes 116a and 116b are a pair of L-shaped members extending along a Z axis and separated from and opposite to each other along a Y axis, the bottom and one side edge of each L-shaped member are coupled to the housing 110, the stop part 116c is located between the pair of L-shaped members, and the sensing unit 142 of the sensor 140 moves into the chutes 116a and 116b along the Z axis through the inlets. The fact that the chutes 116a and 116b, the stop part 116c and the housing 110 are of an integrally formed structure means that the chutes 116a and 116b, the stop part 116c and the rest part of the housing 110 can be easily injection-molded at one time by the same mold during the manufacturing process of the housing 110. This effectively simplifies the manufacturing process of the housing 110 and reduce the cost, and also ensures the structural strength of the mounting structure 116. At the same time, after the sensing unit 142 of the sensor 140 moves into the chutes 116a and 116b, the sensing unit abuts against a stop surface S3 of the stop part 116c to maintain the position of the sensing unit 142 on the Z axis, that is, to ensure that the sensing unit 142 is aligned with the air flowing hole 112d. As shown in FIG. 3B, the stop part 116c and the chute 116a are in an integrated structure, but the embodiment is not limited thereto, and appropriate adjustment can be made according to mold design conditions.

In the embodiment, the mounting structure 116 further includes a pair of limiting parts 116d and 116e which extend along the Z axis and separated from and opposite to each other along the Y axis. As shown in FIG. 3A and FIG. 3B, the limiting parts 116d and 116e correspond to the chutes 116a and 116b respectively, each limiting part 116d or 116e and the corresponding chute 116a or 116b are of an integrally formed structure, and the limiting parts 116d and 116e are respectively located in the chutes 116a and 116b, that is, at inner corners of the corresponding L-shaped members.

Furthermore, the spacing between the pair of limiting parts 116d and 116e is gradually decreased in a direction (Z axis) which is away from the inlets, that is, when viewing the mounting structure 116 from a front view as shown in FIG. 4B, the spacing between the pair of limiting parts 116d and 116e forms a V-like profile, that is, the spacing between the limiting parts 116d and 116e is gradually decreased from top to bottom along the Z axis (toward a negative Z axis direction). Thus, when the sensing unit 142 moves into the chutes 116a and 116b from top to bottom along the Z axis, the limiting parts 116d and 116e are located on two opposite sides of the sensing unit 142. The sensing unit 142 and one of the limiting parts 116d and 116e maintain a larger gap at a top portion of the one of the limiting parts 116d and 116e, as shown in the partial enlarged view of FIG. 4B; however, as the limiting parts 116d and 116e become closer gradually, the gap is gradually decreased till the limiting parts 116d and 116e abut against the sensing unit 142 or even structural interference occurs, and then the sensing unit 142 is clamped and fixed between the limiting parts 116d and 116e of the mounting structure 116 to achieve the effect of fixing the sensor 140.

In addition, the limiting parts 116d an 116e have stop surfaces S4 and S5 respectively which are located in the chutes 116a and 116b and along the Z axis in a movement path of the sensing unit 142. The stop surfaces S4 and S5, and the stop surface S3 of the stop part 116c of the mounting structure 116 provide a relatively stable stopping effect on the sensing unit 140.

On the other hand, referring to FIG. 2B, FIG. 3A and FIG. 3B, in the embodiment, the chutes 116a and 116b which are a pair of L-shaped members respectively include inclined surfaces S1 and S2 at the inlets thereof, and the inclined surfaces S1 and S2 face the inner surface w1 of the front plate 112a and serve as a sighting structure so that an operator can clearly identify the assembling state of the sensor 140 during sensor assembly. As shown in FIG. 1A and FIG. 4C, the front plate 112a of the lower housing body 112 is in an inclined state relative to the Z axis; in order to identify whether the position of the sensing unit 142 aligns to the air flowing hole 112d after moving into the chutes 116a and 116b, a structure which may block the sight of the operator is removed through the chutes 116a and 116b by means of the inclined surfaces S1 and S2, and meanwhile, a combination and fixation relationship between the sensing unit 142 and the chutes 116a and 116b is not affected.

Based on the above description, the embodiment of the invention has at least one of the following advantages or effects:

Since the housing of the projector is provided with at least one air flowing hole for communicating the interior of the housing with the external environment, and the sensor is arranged on the mounting structure formed in the housing and right faces the air flowing hole, the sensor can receive the remote control optical signal transmitted from the external control device through the air flowing hole, and convert the remote control optical signal into the electrical signal, and the electrical signal is transmitted to the corresponding circuit board disposed in the control module. Accordingly, the sensor can operate normally by using the air flowing hole in the housing for air circulation without opening an additional hole or even adding a plate for the decoration on the housing for the sensor, that is to say, the air flowing hole disposed on the housing can be used for both air circulation and receiving the external remote control optical signal.

Furthermore, the mounting structure and the housing are in an integrally formed structure, that is to say, the mounting structure and other structures of the housing can be manufactured simply by the same mold during the manufacturing process of the housing. This effectively simplifies the manufacturing process of the housing and reduces the cost, and also ensures the structural strength of the mounting structure.

In addition, the mounting structure includes the chutes, the stop part and the limiting parts, after the sensing unit moves into the chutes, the sensing unit is positioned by the stop part and the limiting parts, at the same time, the spacing between the limiting parts is gradually decreased from top to bottom along the Z axis which is the movement direction of the sensor during assembling. Therefore, after the sensing unit moves into the chutes, the sensing unit can abut against or even interfere with the limiting parts to clamp and fix the sensing unit. At the same time, the limiting parts have the stop surfaces, so as to provide a stable stopping effect on the sensing unit together with the stop part.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising a housing, a control module and a sensor, wherein
    the housing is provided with at least one air flowing hole and a mounting structure, the mounting structure is located inside the housing, and the air flowing hole communicates with external environment and an interior of the housing, wherein the mounting structure comprises:
        chutes, disposed at and extending along an inner surface of the housing; and
        a stop part, located in the chutes, wherein the sensor is disposed in the chutes and abuts against the stop part so that the sensor aligns to the air flowing hole;
    the control module is disposed inside the housing; and
    the sensor is arranged on the mounting structure and aligns to the air flowing hole, the sensor is electrically connected with the control module, and the sensor receives a remote control optical signal from the external environment to generate an electrical signal and the sensor transmits the electrical signal to the control module.

2. The projector according to claim 1, wherein the air flowing hole is located on a front plate of the housing.

3. The projector according to claim 1, wherein the sensor is in a circuit board-free state, and is electrically connected to a circuit board disposed in the control module through a wire portion.

4. The projector according to claim 1, wherein the mounting structure and the housing are of an integrally formed structure.

5. The projector according to claim 1, further comprising:
a heat dissipation module, disposed inside the housing, the heat dissipation module generating airflow to flow into or out of the housing through the air flowing hole.

6. The projector according to claim 5, wherein a plurality of air flowing holes are disposed in the housing, the airflow flows into or out of the housing through the plurality of air flowing holes, and the sensor right faces one of the air flowing holes.

7. The projector according to claim 1, wherein the chutes are a pair of L-shaped members extending in an axial direction and separated from and opposite to each other, and the stop part is located between the pair of L-shaped members.

8. The projector according to claim 7, wherein the mounting structure further comprises:
a pair of limiting parts, extending in the axial direction and separated from each other, wherein a spacing between the pair of limiting parts is gradually decreased in the axial direction which is away from the inlets, so as to clamp and fix the sensor moved into the chutes.

9. The projector according to claim 8, wherein the pair of limiting parts correspond to the pair of L-shaped members respectively, each limiting part and the corresponding L-shaped member are of an integrally formed structure, and each limiting part is located at an inner corner of the corresponding L-shaped member.

10. The projector according to claim 8, wherein the pair of limiting parts and the stop part each comprise a stop surface which abuts against the sensor moved into the chutes.

11. The projector according to claim 7, wherein the stop part and one of the L-shaped members are of an integrally formed structure.

12. The projector according to claim 7, wherein each of the pair of L-shaped members comprises an inclined surface at the inlet and toward the inner surface.

* * * * *